Patented Feb. 17, 1942

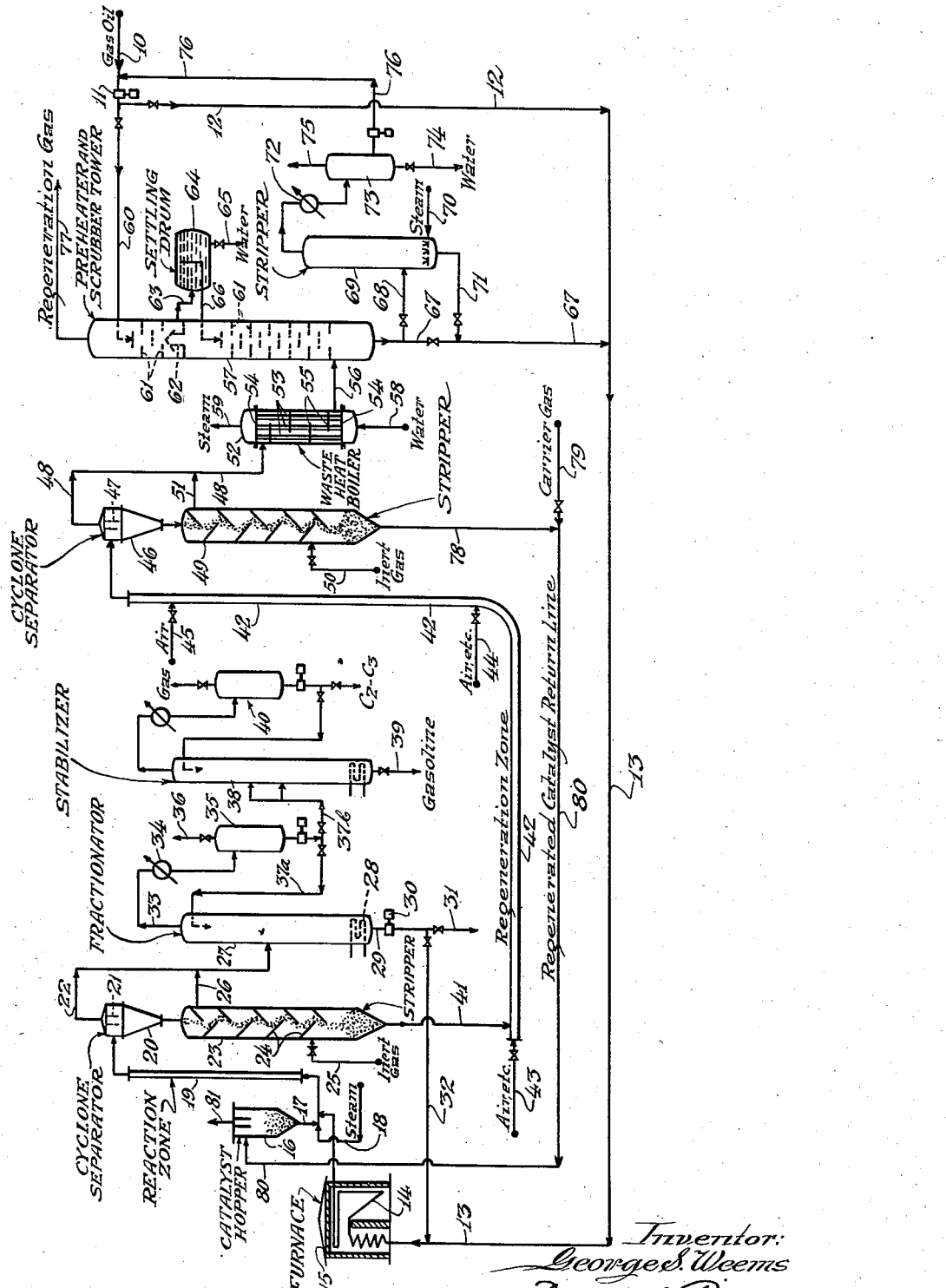

2,273,075

UNITED STATES PATENT OFFICE 2,273,075

POWDERED CATALYST SYSTEM

George S. Weems, 3rd, Hammond, Ind., assignor to Standard Oil Company, Chicago, Ill., a corporation of Indiana Application November 30, 1940, Serial No. 368,017

8 Claims. (Cl. 196—52)

This invention relates to a powdered catalyst system and it pertains more particularly to a system for the conversion of low quality naphtha, gas oils and heavier oils, into high quality motor fuel by means of a powdered catalyst which requires periodic regeneration.

In powdered catalyst systems for the production of high quality motor fuel by cracking, aromatization, hydrogenation, dehydrogenation, isomerization, alkylation, isoforming, etc., it is usually necessary that the catalyst be periodically regenerated by burning carbonaceous deposits therefrom. An object of my invention is to provide an improved method and means for utilizing the heat liberated in this regeneration step. A further object is to provide an improved method and means for preheating a charging stock to such conversion process.

In such powdered catalyst conversion processes enormous amounts of catalyst must continuously be separated from regeneration gases and even though cyclone separators, electrical precipitators, etc., make possible the recovery of more than 99% of this catalyst, a considerable amount of catalyst has heretofore been lost with vented regeneration gases. In a 10,000 barrel per day catalytic cracking plant the catalyst losses from this source may amount to many tons of catalyst per day which involves a financial loss which may range from four or five hundred to several thousand dollars per day. An object of my invention is to prevent all loss of catalyst with regeneration gases.

The powdered catalyst which is not removed from on stream reaction vapors in the cyclone separators, etc., may be recovered by partially condensing the vapors, collecting all of the remaining catalyst in the condensate and recycling the condensate with recovered catalyst to the conversion step. The problem of separating catalyst from regeneration gases cannot be solved in this manner and no commercially feasible method has heretofore been developed for recovering the last traces of catalyst from regeneration gases. My invention is directed particularly to the solution of this problem and it provides a method and means whereby the final traces of catalyst in regeneration gases may be picked up in incoming feed stock so that the heat of the gases will preheat the said stock at the same time that catalyst material is being removed from the gases.

A further object of my invention is to provide an improved method and means for removing water and deleterious gases from the charging stock either during or after a preheating and scrubbing step. Other objects will become apparent as the detailed description of the invention proceeds.

In practicing the invention I separate the major part of the powdered catalyst from regeneration gases by cyclone separators or other conventional means. I then cool the regeneration gases from about 1000 or 1100° F. to at least about 700° F. or preferably to about 600° F. in a heat exchanger which may be a waste heat boiler or a charging stock preheater. The regeneration gases which have thus been cooled to at least about 700° F. are countercurrently scrubbed with some or all of the incoming charging stock under such conditions that there will be no appreciable vaporization of the charging stock, in this countercurrent scrubbing operation the regeneration gases are cooled to about atmospheric temperatures and the charging stock may be heated to temperatures approaching but not exceeding its boiling point. The charging stock not only picks up the remaining heat from the regeneration gases but it also scrubs the last traces of catalyst out of the gases and carries this catalyst through the pipe still heater to the catalytic conversion zone.

The carbonaceous deposit on the catalyst material contains appreciable amounts of hydrogen and it may also contain sulfur compounds. In the regeneration step this hydrogen is oxidized to form steam. The combustion steam together with any additional steam that may have been introduced into the regeneration gases must be removed from the system. If the vapor pressure of the charging stock is sufficiently low this steam may simply be reworked with gases from the top of the scrubber. With ordinary gas oil or lighter stocks this steam must be removed as water at an intermediate point in the countercurrent scrubbing system; the steam will condense before it reaches the top of the scrubber and being heavier than the oil the condensed water will tend to settle at the bottom of the scrubber until it reaches a point where the temperature in the scrubber is sufficient to revaporize it. In order to eliminate water from the scrubber I provide a trapout plate at a point therein at which the temperature corresponds to the dew point of the water in the regeneration gases. I introduce liquids from the trapout plate into a separating drum, withdraw water from the base of said drum and return oil from the top of said drum to the scrubbing tower.

When charging stocks contain appreciable amounts of sulfur the regeneration gases may contain sulfur dioxide. Also regeneration gases usually contain a small amount of excess oxygen. In order to remove dissolved oxygen, sulfur dioxide and other deleterous gases from the hot charging stock that has passed through the preheater or scrubber, I may strip the hot stock with steam, recover any oil which is thus removed with the stripping steam and return the recovered oil to the scrubbing tower or to a stream of oil en route to the pipe still. I utilize the heat of the regeneration gases, I recover the last traces of catalyst material therefrom, I provide for the removal of water from the regeneration gas scrubber and I provide for the removal of dissolved oxygen and deleterious gases which might otherwise impair the quality of the motor fuel.

The invention will be more clearly understood from the following detailed description and from the accompanying drawing wherein my improved conversion and catalyst recovery system is diagrammatically illustrated by a schematic flow sheet.

While the invention is applicable to any hydrocarbon conversion process which employs powdered catalyst, I will describe as a preferred embodiment the application of a powdered catalyst to a catalytic cracking process for the conversion of gas oil into high quality motor fuel. Gas oil from line 10 is forced by pump 11 through lines 12 and 13 to coils 14 of pipe still furnace 15. Powdered catalyst from hopper 16, which may be an aerated standpipe for providing the requisite pressure, is introduced through line 17 into the discharge line of coils 14 by means of a steam injector using steam from line 18 although other feeder mechanisms may be used. The gas oil is preferably heated to a temperature of about 800 to 1050° F. under a pressure which may range from atmospheric to 50 pounds or higher and under these temperatures and pressures the hot vapors carry the powdered catalyst through reaction zone 19 which is so designed as to give a time of contact of about 1 to 50 seconds or more. Usually about 0.2 to 20 pounds of powdered catalyst are employed per pound of liquid gas oil charging stock.

The reaction vapors together with the suspended catalyst material are tangentially introduced into one or more cyclone separators 20 which are provided with a central cylindrical baffle 21 through which hydrocarbon vapors are removed by means of line 22. The separated catalyst, usually about 95 to 99.9% thereof, is withdrawn from the bottom of separator 20 into catalyst stripper 23 which is provided with inclined baffles 24. A stripping gas which may be steam or a hot normally gaseous hydrocarbon is introduced through line 25 and passed upwardly in the stripper at too low a velocity to interfere with the downward passage of the catalyst. Stripper gas is removed from the stripper through line 26 to line 22 and the reaction product together with the stripper gas are introduced into fractionating column 27 which is provided with a suitable reboiler 28 at its base. Heavier-than-gasoline hydrocarbons containing last traces of catalyst are withdrawn from the column through line 29 and are delivered by pump 30 either through line 31 to storage and catalyst recovery system (not shown) or to some other conversion process or through line 32 and line 13 for further conversion in the cracking process.

Gasoline and normally gaseous hydrocarbons are taken overhead from column 27 through line 33 and cooler 34 and are then introduced into receiver 35 from which separated gases are vented through line 36. A part of the condensed liquids from receiver 35 may be recycled through line 37A and serves as reflux in the top of tower 27 and the remainder introduced through line 37B to stabilizer 38. Gasoline is withdrawn from the bottom of the stabilizer through line 39 and the gases may be taken overhead, partially condensed for refluxing the top of the stabilizer etc. through system 40. It will be understood of course that any other fractionating system may be employed.

Stripped catalyst from the base of catalyst stripper 23 is pumped by a pressure feeder such as a Fuller-Kenyon screw pump or is introduced by fluid head at the base of a standpipe containing aerated catalyst through line 41 to regeneration chamber 42 into which regulated amounts of air are introduced through lines 43, 44 and 45. The air acts as pneumatic conveying means for carrying the powdered catalyst through the regeneration zone and the amount of introduced oxygen is regulated in order to prevent regeneration temperatures exceeding 1050 to 1100° F. External cooling, stage cooling, or any other conventional means may be employed to keep the regeneration temperature within safe limits.

The hot regeneration gases and regenerated catalyst are then introduced into cyclone separator 46 (or to a series of such separators) which is provided with a central cylindrical baffle 47 through which regeneration gases are withdrawn by means of line 48. Regenerated catalyst then passes through stripping column 49, a suitable stripping gas such as steam or flue gas being introduced through line 50 and withdrawn through line 51 which discharges into line 48.

The gases in line 48 may contain from .1% to as much as about 5% of the total catalyst which is being circulated and it is, therefore, essential that this catalyst be recovered. For cracking the catalyst may be an activated hydrosilicate of alumina prepared by acid treating or otherwise activating bentonite or other suitable clays. Preferably, however, the cracking catalyst is of the synthetic gel or synthetic zeolite type and is prepared by depositing alumina or alumina and zirconia or other metal oxides on silica gel, by coprecipitating alumina and silica gels followed by a washing and drying thereof or by leaching alkali ions out of synthetic or natural zeolites or by replacing the alkali ions by alumina, etc. For aromatization the catalyst is preferably a Sixth Group metal oxide such as molybdenum or chromium oxide mounted on activated alumina or acid treated bauxite. The invention is not limited to any particular type of catalyst and since catalysts per se are well known in the art a further description of them is unnecessary. All of these catalysts are so expensive that it is desirable and almost essential that catalyst losses with regeneration gases be avoided.

In the catalytic conversion system hereinabove described and using an activated bentonite catalyst, a specific example might be substantially as follows: oil is heated to about 950° F., powdered catalyst is introduced into the hot vapor stream in amounts corresponding to about a 3:1 catalyst-to-oil weight ratio, the reactor is maintained at a pressure of about 11 pounds per square inch, the oil contact time in the reactor is about 10 seconds and the catalyst contact or holding time in the reactor is about 210 seconds. After the separation of reaction products from the catalyst the spent catalyst is regenerated at a temperature of about 1000 to 1050° F. in a regeneration chamber wherein air is introduced to support combustion and wherein the gas contact time is about 13 seconds and the catalyst contact or holding time is about 250 seconds. The above conditions are not critical and it should be understood that the cracking and regeneration may be carried out under a wide variety of conditions. The present invention, however, is not concerned with such conditions per se and they, therefore, will require no further description.

The hot regeneration gases in line 48 may be at a temperature of about 1000 to 1050° F. and they may contain considerable amounts of catalyst. In practicing my invention I first pass these hot regeneration gases through a heat exchanger which is preferably a waste heat boiler 52, the hot gases preferably flowing around the outside of tubes 53 which are welded in tube sheets 54. Baffles 55 insure circuitous flow of hot gases around the tubes. The gases leaving heat exchanger 52 through line 56 are at a temperature not higher than about 700° F. and are preferably at a temperature of about 500 or 600° F. at which temperature the gases together with the catalyst particles suspended therein are introduced in the base of scrubber tower 57.

Water may be introduced into heat exchanger 52 through line 58 and steam may be withdrawn therefrom through line 59. Alternatively this heat exchanger may be employed for preheating a part or all of the charging stock, for example, a part of the original charge may be passed directly through heat exchanger 52, the oil leaving the scrubber may be passed through this heat exchanger 52 en route to pipe still furnace 15, etc.

A part or all of the gas oil charging stock, preferably about one-third thereof, is introduced through line 60 at the top of the scrubbing tower 57. If a plurality of charging stocks are available, the stock with the lowest vapor pressure should be charged through line 60 to the scrubber. This scrubbing tower is provided with suitable baffles 61 or preferably it is provided with conventional bubble plates. With about one-third of the charging stock introduced at a temperature of about 100° F. through line 60 and with regeneration gases entering the base of the scrubber through line 56 at a temperature of about 600° F., the bottom of the scrubber operates at about 400° F. and the top at about 100° F. Since the regeneration gases contain considerable amounts of steam there will be a condensation of this steam at some intermediate point in the scrubber, the point at which the temperature corresponds to the dew point of the steam in the regeneration gases. At this point I provide a liquid trapout plate 62 and I withdrawn liquids from this plate through line 63 to enlarged settling drum 64. Condensed water is drawn off at the base of this drum through line 65 and oil is introduced from the top of the settling drum through line 66 back to the scrubber tower 57. With charging stocks having appreciable vapor pressures it is essential that this water be removed from the scrubber at an intermediate point because the high temperatures at the bottom prevent the escape of any water at the base of the tower and the low temperatures in the upper part of the tower cause a condensation of the water and a settling out thereof before the gases reach the top of the scrubber.

The regeneration gases may contain a small amount of sulfur dioxide, oxygen and other gases which are somewhat soluble in the oil, particularly when the scrubber is operated at a pressure of about 45 to 50 pounds per square inch. Where no appreciable amounts of oxygen or other deleterious gases are absorbed from the regeneration gases of the charging stock in the scrubber, the scrubbing oil which has picked up all the catalyst from the regeneration gases leaves the base of the scrubber through line 67 at a temperature of about 400° F. and this oil, together with its contained catalyst, is then charged to the pipe still coils through line 13. When it is necessary to remove deleterious gases the hot oil from the base of the scrubber may be passed through line 68 to stripper column 69 into which steam is introduced through line 70. The stripped oil is returned to line 67 through line 71. The overhead from the stripper is passed through a cooler 72 to a separator 73 from which water is withdrawn through line 74, gases are vented through line 75 and oil is passed by line 76 either to the inlet side of pump 11 or is pumped back to the scrubbing tower or into lines 67 or 12.

The cold regeneration gas leaves the top of the scrubber 57 through line 77. Not only has this gas been denuded of catalyst but it has also considerably preheated a substantial portion of the charging stock. Even the heat of condensation of the steam has been utilized for preheating the charging stock. The amount of hydrocarbon vapors which are lost from the system with cold regeneration gas and with gases vented through line 75 is negligible compared to the enormous savings in catalyst cost and the efficient utilization of all of the heat contained in the regeneration gases.

The stripped catalyst from the tower 49 is withdrawn through line 78 and pneumatically conveyed by a carrier gas introduced through line 79 back through line 80 to the powdered catalyst hopper 16 which, as above stated, may be at the top of a standpipe containing aerated catalyst. The carrier gas removed from the top of the hopper through line 81 is preferably introduced into line 48 so that no catalyst will be lost from the system. It should be understood, however, that stripper 49 may be positioned above a standpipe containing aerated catalyst and the catalyst may be introduced directly from the base of this standpipe into the furnace transfer line or into the base of reaction chamber 19 without the necessity of employing carrier gas.

While I have described a preferred embodiment of my invention in connection with the conventional powdered catalytic cracking system it should be understood that the invention is equally applicable to other catalytic systems. When my invention is employed in an isoforming or aromatization system employing a naphtha instead of a gas oil charging stock, the regeneration gases should be cooled to lower temperatures or the scrubbing tower should be operated at higher pressures in order to prevent vaporization of the charging stock at the base of the scrubbing tower. The size, dimensions and design of the scrubbing tower will depend of course, on the type of process and the amount of carbon that is burned from the catalyst during regeneration. In the catalytic cracking process wherein about 3 or 5 pounds of carbonaceous material (approximately ten percent hydrogen) are deposited on the catalyst per 100 pounds of oil charged, simple calculations will show that about 1 to 1½ mols of air will have to be charged to the regeneration system for each 100 pounds of charging stock charged to the reactor. From simple chemical engineering calculations the volumes of the resulting flue gases may be determined and the scrubbing tower can be designed accordingly.

The permissible temperature and required pressure at the top of the scrubber tower is dependent in large measure on the vapor pressure of the charging stock. For ordinary gas oil with initial boiling point of about 400° F. the following table will illustrate approximate losses from a system charging 10,000 barrels per day and depositing about 3½% of carbonaceous material (based on feed) on the catalyst.

*Barrels of charge per day lost with regeneration gases*

| Stripper pressures | Stripper top temperatures | | | |
|---|---|---|---|---|
| | 80° F. | 90° F. | 100° F. | 110° F. |
| | Barrels | Barrels | Barrels | Barrels |
| Atmospheric | 12.3 | 17.5 | 26.8 | 36.8 |
| 30 pounds gage | 6.1 | 8.9 | 13.3 | 18.4 |
| 45 pounds gage | 3.7 | 5.9 | 8.8 | 12.3 |
| 100 pounds gage | 1.8 | 2.7 | 4.0 | 5.7 |

For charging stocks of higher initial boiling point and hence lower vapor pressures the losses will be less than above indicated and in fact if the vapor pressure of the charging stock is sufficiently low I may operate the scrubber at sufficiently high top temperature to eliminate the water in vapor form with the exit gases without suffering appreciable oil losses. Oil losses are also decreased by using higher scrubber pressures, but the cost of compression may outweigh possible savings in charging stock. I prefer to operate the scrubber at about the same pressure as that in the regeneration zone.

While a single cyclone separator has been shown at various points in the system for separating catalyst from vapors it should be understood that in actual practice two or more of such separators may be used in series or such separators may be supplemented with Cottrell precipitators or other conventional gas-solid separation means. My invention is not limited to the particular modification hereinabove described nor to the particular separating conditions hereinabove set forth since various modifications and equivalents thereof will be apparent to those skilled in the art from the above description.

I claim:

1. The method of converting normally liquid hydrocarbon charging stocks into high quality motor fuels which comprises heating said charging stocks to a temperature of about 800 to 1100° F., contacting said heated charging stock with a powdered catalyst for converting substantial amounts thereof into high quality motor fuel, the catalyst becoming coated with a carbonaceous deposit during said conversion step, separating said coated catalyst from hydrocarbon vapors, regenerating said separated catalyst by the introduction of air for effecting the combustion of carbonaceous deposits therefrom at a temperature not exceeding about 1100° F. whereby hot regeneration gases are produced, mechanically separating most of the regenerated catalyst from the hot regeneration gases and returning the separated catalyst to said contacting step, cooling said hot regeneration gases to a temperature of about 700° F., scrubbing said cooled regeneration gases with at least a portion of the charging stock whereby said charging stock picks up both heat and suspended catalyst from said regeneration gases and introducing the charging stock from said scrubbing step to said charging stock heating step.

2. The method of claim 1 includes the further step of removing water from the system in said scrubbing step.

3. The method of claim 1 which includes the step of removing dissolved gases and vapors from that portion of the charging stock which has been employed in the scrubbing step.

4. In a catalytic conversion system wherein carbonaceous material is deposited on catalyst in a reaction zone and is subsequently burned from said catalyst in a regeneration zone, the method of separating regenerated catalyst from hot regeneration gases which comprises centrifugally separating most of the catalyst from the hot regeneration gases and stripping the remainder of the catalyst from the hot regeneration gases by scrubbing said gases with at least a part of the incoming charging stock to said system.

5. In a catalytic hydrocarbon conversion system wherein the catalyst becomes coated with a carbonaceous deposit in a reaction zone and is regenerated by the combustion of said deposits in a regeneration zone at a temperature of about 1000° F. and wherein the bulk of the regenerated catalyst is mechanically separated from the hot regeneration gases for reuse, the method of recovering residual amounts of catalyst from hot regeneration gases which comprises countercurrently scrubbing said gases with a hydrocarbon oil under a pressure sufficient to prevent appreciable vaporization of said oil and removing from the oil used in said scrubbing step the water resulting from the combustion of hydrogen in the regeneration step.

6. The method of catalytically converting a charging stock comprising gas oil into substantial yields of high quality motor fuel which comprises heating said charging stock to a temperature of about 800 to 1100° F., contacting said heated charging stock with a powdered catalyst for effecting said conversion, separating gases and vapors from catalyst which has become coated with a carbonaceous deposit, regenerating said catalyst by burning said carbonaceous deposit therefrom whereby hot regeneration gases are produced, separating said hot regeneration gases from the bulk of regenerated catalyst, countercurrently scrubbing said regeneration gases with charging stock in a scrubbing zone maintained under sufficient pressure to prevent substantial vaporization of the charging stock in said scrubbing step, obtaining substantially intimate contact in said scrubbing step to effect the removal of catalyst particles from the regeneration gas and passing charging stock together with catalyst particles from said scrubbing step to said heating step.

7. The method of claim 4 which includes the steps of introducing hot regeneration gases containing the remainder of the catalyst into a countercurrent scrubbing zone at a point adjacent the base thereof, introducing at least a portion of the incoming charging stock at the top of said scrubbing zone, maintaining sufficient pressure in the scrubbing zone to prevent appreciable vaporization of said charging stock, withdrawing cool regeneration gases from the top of the scrubbing zone and withdrawing heated charging stock and recovered catalyst from the base of said scrubbing zone.

8. The method of claim 4 wherein the regeneration gas includes steam and which includes the steps of effecting the scrubbing at such a temperature that the steam condenses to water and forms a water-charging stock mixture, withdrawing this mixture from an intermediate point in the scrubbing zone, separating and removing water from the withdrawn mixture, and returning the charging stock fraction which has been freed from water to said scrubbing zone.

GEORGE S. WEEMS, 3RD.